US012079692B2

United States Patent
Bohn et al.

(10) Patent No.: US 12,079,692 B2
(45) Date of Patent: Sep. 3, 2024

(54) COMPACT LASER DELIVERY TO A QUBIT ION AND A SYMPATHETIC COOLING ION IN A TRAPPED ION QUANTUM COMPUTER

(71) Applicant: Quantinuum LLC, Broomfield, CO (US)

(72) Inventors: Matthew Bohn, Broomfield, CO (US); Lora Nugent, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 1033 days.

(21) Appl. No.: 17/008,832

(22) Filed: Sep. 1, 2020

(65) Prior Publication Data

US 2021/0075184 A1    Mar. 11, 2021

Related U.S. Application Data

(60) Provisional application No. 62/896,970, filed on Sep. 6, 2019.

(51) Int. Cl.
*G06N 10/40* (2022.01)
*G02F 1/35* (2006.01)
*H01S 3/13* (2006.01)

(52) U.S. Cl.
CPC ............ *G06N 10/40* (2022.01); *G02F 1/353* (2013.01); *H01S 3/1305* (2013.01); *G02F 2203/56* (2013.01)

(58) Field of Classification Search
CPC ........ G06N 10/40; G06N 10/00; G02F 1/353; G02F 2203/56; H01S 3/1305
See application file for complete search history.

(56) References Cited

U.S. PATENT DOCUMENTS 10,050,704 B1 *  8/2018  Yap ................ H01S 5/0687
2004/0017833 A1  1/2004  Cundiff et al.
(Continued)

FOREIGN PATENT DOCUMENTS

WO   2018/129297 A1   7/2018
WO   2019/073202 A1   4/2019

OTHER PUBLICATIONS

Barrett, Murray D., et al. "Sympathetic cooling of 9 Be+ and 24 Mg+ for quantum logic." Physical Review A 68.4 (2003): 042302. (Year: 2003).*

(Continued)

*Primary Examiner* — KC Chen
(74) *Attorney, Agent, or Firm* — Alston & Bird LLP (57) ABSTRACT

Various embodiments for precise and accurate delivery, in terms of position, frequency, and/or phase, of one or more lasers to an atomic system are provided. In a first embodiment, a gate laser system for a trapped ion quantum computer comprising a first and second laser are provided. The first and second lasers are frequency locked to a first and second frequency of a frequency comb, respectively. The first and second lasers are each configured to provide laser beams to a qubit ion within an ion trap of the quantum computer to provide a gate. In another embodiment, a qubit ion and sympathetic ion management system for a trapped ion quantum computer comprising a first, second, and third laser is provided. Each laser is locked to a different frequency of a frequency comb, and provide one or more laser beams to an ion trap of the quantum computer.

20 Claims, 6 Drawing Sheets

(56) References Cited

U.S. PATENT DOCUMENTS

| | | | | |
|---|---|---|---|---|
| 2008/0075464 | A1* | 3/2008 | Maleki | G02B 6/29395 |
| | | | | 398/85 |
| 2009/0230962 | A1* | 9/2009 | White | G01N 24/08 |
| | | | | 324/317 |
| 2009/0245306 | A1* | 10/2009 | Rakuljic | H01S 5/4006 |
| | | | | 372/32 |
| 2012/0320449 | A1* | 12/2012 | Savchenkov | H01S 5/0687 |
| | | | | 359/340 |
| 2016/0321558 | A1* | 11/2016 | Nakamura | G02F 1/0126 |
| 2019/0138928 | A1* | 5/2019 | Monroe | G06N 10/00 |
| 2019/0296831 | A1* | 9/2019 | Dillon | H04B 10/64 |
| 2021/0049494 | A1* | 2/2021 | King | G06N 20/20 |

OTHER PUBLICATIONS

Annex to the Extended European Search Opinion issued in European Application No. 20194204.2 issued on on Feb. 10, 2021, 7 pages.

Extended European Search Report issued in European Application No. 20194204.2 issued on on Feb. 10, 2021, 22 pages.

Schindler et al. "A quantum information processor with trapped ions," New Journal of Physics Publishing, 2013, vol. 15, No. 12, pp. 1-38.

EP Office Action Mailed on Oct. 25, 2023 for EP Application No. 20194204, 10 page(s).

Mount, Emily, et al., "Scalable digital hardware for a trapped ion quantum computer", Quantum Information Process, Sep. 19, 2015, pp. 5281-5298, vol. 15. No. 12, Springer, US.

Hayes, D., et al., "Entanglement of Atomic Qubits using an Optical Frequency Comb", submitted Jan. 13, 2010, Cornell University Library Online Archive, available on the Internet at https://arxiv.org/pdf/1001.2127v1, 5 pages.

Hayes, D., et al., "Entanglement of Atomic Qubits using an Optical Frequency Comb", submitted Jan. 21, 2010, Cornell University Library Online Archive, available on the Internet at https://arxiv.org/pdf/1001.2127v2, 5 pages.

Summons to Attend Oral Proceeding Mailed on Apr. 16, 2024 for EP Application No. 20194204, 13 page(s).

\* cited by examiner

COMPACT LASER DELIVERY TO A QUBIT ION AND A SYMPATHETIC COOLING ION IN A TRAPPED ION QUANTUM COMPUTER

RELATED APPLICATION INFORMATION

The following application claims priority from U.S. Provisional Application No. 62/896,970, filed Sep. 6, 2019, the content of which is incorporated herein by reference in its entirety.

TECHNICAL FIELD

Various embodiments relate to laser delivery to an atomic system. For example, various embodiments relate to laser delivery in a trapped ion quantum computer.

BACKGROUND

In various atomic systems, it is important to be able to deliver laser beams to the system at particular frequencies and/or groups of laser beams having particular frequency separations to the atomic system. For example, trapped ion quantum computing uses laser beams to complete various functions within the trapped ion quantum computer. For example, the logic gates of the quantum computer may be implemented using laser beams to control or influence the evolution of quantum states of qubits. Such applications require that the lasers are delivered to the ion trap precisely and accurately in terms of position, frequency, and phase.

BRIEF SUMMARY OF EXAMPLE EMBODIMENTS

Example embodiments provide methods and systems for precise and accurate delivery, in terms of position, frequency, and/or phase, of one or more lasers to an atomic system. For example, various embodiments may be implemented in atomic systems such as atomic clocks, Bose-Einstein condensate systems, trapped ion systems, and/or other atomic systems. For example, example embodiments provide methods and systems for precise and accurate delivery, in terms of position, frequency, and/or phase, of one or more lasers to an ion trap of a trapped ion quantum computer. In various embodiments, ions trapped within the ion trap of a trapped ion quantum computer are used as the qubits (quantum bits) of the quantum computer. In various embodiments, a frequency comb is used to stabilize the frequency of one or more lasers such that a stabile frequency laser beam may be provided to the trapped ion(s) of a trapped ion quantum computer such that evolution of the quantum states of one or more trapped ions may be controlled and/or influenced.

Traditionally, the delivery of lasers to a trapped ion qubit of a trapped ion quantum computer is done using beamlines. Beamlines allow for the light emitted by a laser to be split into multiple laser beams (e.g., five laser beams), have the frequency of each laser beam individually shifted to a desired frequency, and delivered to the ion trap. However, such beamlines require large combinations of optics, mounts, and electro optics that require a significant amount of space (e.g., a 5'×10' optical table). Various embodiments presented herein provide an improvement to the complexity and physical space required by the beamline delivery of lasers to a trapped ion quantum computer.

In various embodiments, a frequency comb is used to frequency stabilize the frequency of lasers used in a trapped ion quantum computer. In an example embodiment, the lasers are mounted in a rack mount, thereby eliminating at least some of the beamlines from the quantum computer. In various embodiments, two or more lasers at close but distinct frequencies are frequency locked with a frequency comb. For example, for a quantum computer using Yb171 ions as qubits, three (or multiples of three) lasers at a nominal wavelength of 369 nm may be used, with a first laser locked to the resonant frequency of the qubit transition (e.g., at the nominal wavelength of 369 nm). For example, the first laser may be locked to a frequency having a first offset from the resonant frequency of the qubit transition, where the first offset is 0 GHz. A second laser may be locked to a second frequency being a second offset from the resonant frequency of the qubit transition. The second offset is 14.7 GHz, in an example embodiment. A third laser may be locked to a third frequency being a third offset from the resonant frequency of the qubit transition. The third offset is 2.1 GHz, in an example embodiment. As should be understood, the frequency of the lasers and the corresponding offsets may be modified in accordance with the ion used as the trapped ion qubit. In various embodiments, the three (and/or multiple of three) lasers may be integrated into the frequency comb system and delivered via fiber optics to the physics package (e.g., cryo and/or vacuum chamber enclosing the ion trap, the ion trap, and/or the like). In various embodiments, a pair of lasers for use as optical gate lasers may be coupled to a frequency comb.

In various embodiments, a frequency comb may be used as a low phase noise source. For example, the optical phase stability of the frequency comb may be transferred to radio frequency (RF) stability. The optical gate lasers used in a trapped ion quantum computer should have low phase noise to reduce gate errors and increase the fidelity of the gates. Various embodiments provide for very low phase noise between pairs and/or groups of lasers (e.g., less than 50 milliradians between two lasers). Thus, in various embodiments, a frequency comb is used to frequency and phase lock two or more lasers to a particular frequency separation and within very low phase noise between the two or more lasers of a trapped ion quantum computer. In an example embodiment, the particular frequency separation is selected based on the qubit ion of the trapped ion quantum computer.

According to a first aspect of the present disclosure, a gate laser system for a trapped ion quantum computer comprises a first laser frequency locked to a first frequency of a frequency comb, and a second laser frequency locked to a second frequency of the frequency comb. The first and second lasers are each configured to provide a laser beam to a qubit ion within an ion trap of the trapped ion quantum computer to provide a gate. In an example embodiment, a first radio frequency local oscillator (RF LO) is coupled to the first laser and a second RF LO is coupled to the second laser. In an example embodiment, the gate laser system further comprises first and second offset lock electronics. The first RF LO is coupled to the first laser via this first offset lock electronics, and the second RF LO is coupled to the second laser via this second offset lock electronics. In an example embodiment, a first photodiode is configured to receive a portion of a first laser beam emitted by the first laser and provide feedback to the first offset lock electronics, and a second photodiode is configured to receive a portion of a second laser beam emitted by the second laser and provide feedback to the second offset lock electronics.

In an example embodiment, a third photodiode is configured to receive another portion of the first laser beam and another portion of the second laser beam. The third photodiode is also configured to provide a laser offset signal to a mixer. The third photodiode is a high frequency photodiode. The example embodiment further comprises a high frequency oscillator configured to provide an oscillator signal to the mixer. The mixer is configured to compare the laser offset signal and the oscillator signal and provide a comparison signal to locking electronics. The locking electronics are coupled to the second RF LO via a modulation input port of the second RF LO. In an example embodiment, the locking electronics are coupled to the first RF LO via a modulation input port of the first RF LO. In an example embodiment, the high frequency oscillator is a high frequency low noise radio frequency oscillator.

In an example embodiment of the first aspect of the present disclosure, the first and second frequencies are offset by a second offset, the second offset being non-zero. In an example embodiment, a frequency comb generator is configured to generate the frequency comb.

According to a second aspect of the present disclosure, a qubit ion and sympathetic cooling (SC) ion management system for a trapped ion quantum computer is provided. This management system comprises a first laser frequency locked to a first frequency of a frequency comb, a second laser frequency locked to a second frequency of the frequency comb, and a third laser frequency locked to a third frequency of the frequency comb. The second frequency is offset from the first frequency by a non-zero second offset, and the third frequency is offset from the first frequency by a non-zero third offset. The first, second, and third lasers are each configured to provide one or more laser beams to an ion trap of the trapped ion quantum computer.

In an example embodiment, the ion trap of the trapped ion quantum computer contains at least a qubit ion and a SC ion. In an example embodiment, at least a portion of a first laser beam generated by the first laser is used for qubit ion detection. In another example embodiment, at least a portion of a second laser beam generated by the second laser is used for qubit ion cooling. In another example embodiment, at least a portion of a third laser beam generated by the third laser is used for qubit ion state preparation. In an example embodiment, the first, second, and third frequencies and the second and third offsets are determined based at least in part on a resonant frequency of a particular quantum transition of the qubit ion.

In an example embodiment, the system further comprises a fourth laser frequency locked to a first SC frequency of the frequency comb, and a fifth laser frequency locked to a second SC frequency of the frequency comb, the first and second SC frequencies being offset from one another by a SC offset. The fourth and fifth lasers are each configured to provide one or more laser beams to an ion trap of the trapped ion quantum computer. In an example embodiment, at least a portion of a fourth laser beam generated by the fourth laser is used for SC ion cooling. In another example embodiment, at least a portion of a fourth laser beam generated by the fourth laser is used for SC ion optical pumping. In another example embodiment, at least a portion of a fifth laser beam generated by the fifth laser is used for SC ion sideband cooling. In an example embodiment, the first, second, and third lasers are each configured to provide one or more laser beams to the qubit ion, and the fourth and fifth lasers are each configured to provide one or more laser beams to the SC ion.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

As described above, in various atomic systems, it is important to be able to precisely and accurately, in terms of position, frequency, and/or phase, deliver one or more laser beams to the atomic system. For example, in atomic systems such as atomic clocks, Bose-Einstein condensate systems, trapped ion systems, and/or other atomic systems, precise and accurate laser beam delivery is important for various uses of the system, manipulating the system, and/or the like. Various example embodiments corresponding to trapped ion quantum computer systems will now be described in more detail.

Exemplary Quantum Computer System

Figure 1:
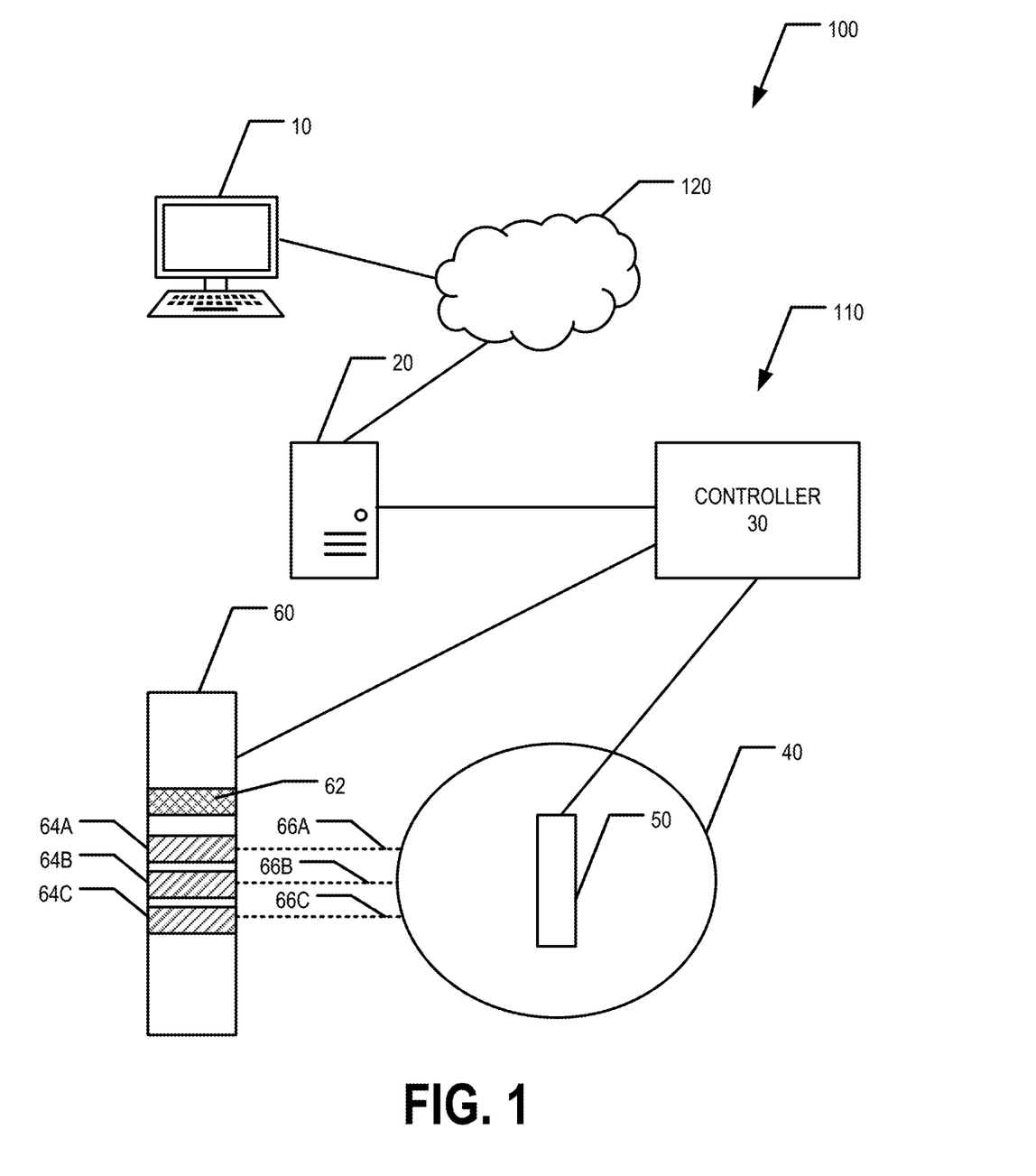
FIG. 1 provides a schematic diagram of an example trapped ion quantum computer system, in accordance with an example embodiment.

FIG. 1 provides a schematic diagram of an example trapped ion quantum computer system 100, in accordance with an example embodiment. In various embodiments, the trapped ion quantum computer system 100 comprises a user computing entity 10, a system computing entity 20, and a quantum computer 110. In various embodiments, the quantum computer 110 comprises a controller 30, a cryo and/or vacuum chamber 40 enclosing an ion trap 50, and a laser rack 60. In various embodiments, the laser rack 60 houses a frequency comb generator 62, and a plurality (e.g., two or more) of lasers 64 (e.g., 64A, 64B, 64C).

In various embodiments, a user computing entity 10 is configured to allow a user to provide input to the quantum computer system 100 (e.g., via a user interface of the user computing entity 10) and receive, view, and/or the like output from the quantum computer system 100. The user computing entity 10 may be in communication with the system computing entity 20 via one or more wired or wireless networks 120. The system computing entity 20 is configured to act as an intermediary between one or more user computing entities 10 and the controller 30. For example, the system computing entity 20 may translate, configure, format, and/or the like information/data, quantum computing algorithms, and/or the like provided by the user computing entity 10 into a computing language, executable instructions, command sets, and/or the like that the controller 30 can understand, execute, and/or implement. Likewise, the system computing entity 20 may translate, configure, format, and/or the like information/data, commands, quantum computation results, and/or quantum information provided by the controller 30 into information/data that the user computing entity 10 can understand, process, and/or implement.

In various embodiments, the controller 30 is configured to control the ion trap 50, cooling and/or vacuum systems (not shown) controlling the temperature and pressure within the cryo and/or vacuum chamber 40, frequency comb generator 62, lasers 64, and/or other components of the quantum computer 110 (e.g., an optical collection system configured for "reading" the output of the quantum computer). In various embodiments, the controller 30 is configured to control various components of the quantum computer 110 in accordance with executable instructions, command sets, and/or the like provided by the system computing entity 20. In various embodiments, the controller 30 is configured to receive output from the quantum computer 110 (e.g., from an optical collection system) and provide the output and/or the result of a processing the output to the system computing entity 20.

In various embodiments, the frequency comb generator 62 is configured to generate a frequency comb. The plurality (e.g., two or more) lasers 64 (e.g., 64A, 64B, 64C) may be locked (e.g., frequency and/or phase locked) to the frequency comb. The lasers 64 may then be operated to provide laser beams to the cryo and/or vacuum chamber 40 enclosing the ion trap 50 and/or ion trap 50 via optical fibers 66 (e.g., 66A, 66B, 66C), such that laser beams are accurately and precisely delivered to qubit ions within the ion trap 50 (e.g., in terms of position, frequency, and/or phase). In various embodiments, the ion trap 50 is configured to trap a plurality of ion pairs, where each ion pair comprises a qubit ion and a sympathetic cooling (SC) ion. In various embodiments, the SC ion is used to aid in the cooling of the qubit ion. For example, the qubit ion may be unable to be cooled directly (e.g., without effecting the quantum state of the qubit ion), or cooling the qubit ion directly may not be efficient.

In various embodiments, the frequency comb generator 62 generates a frequency comb that is used to lock two or more lasers to particular frequencies (e.g., with a particular frequency separation). In various embodiments, a frequency comb is used to lock two or more lasers such that the phase noise between the lasers is very low (e.g., no more than 50 milliradians of phase difference between two lasers). In various embodiments, a frequency comb is a laser source whose spectrum consists of a series of discrete, equally spaced frequency lines. In various embodiments, the frequency comb generator 62 may take a variety of forms. For example, the frequency comb may be generated via various mechanisms, including periodic modulation (in amplitude and/or phase) of a continuous-wave laser, four-wave mixing in nonlinear media, and stabilization of the pulse train generated by a mode-locked laser. In various embodiments, the frequency comb is used to coordinate and/or stabilize the frequency (or wavelength) separation between two or more lasers by providing a wavelength/frequency reference for each of the two or more lasers.

Exemplary Qubit Ion/Sympathetic Cooling Ion Management Scheme

Figure 2:
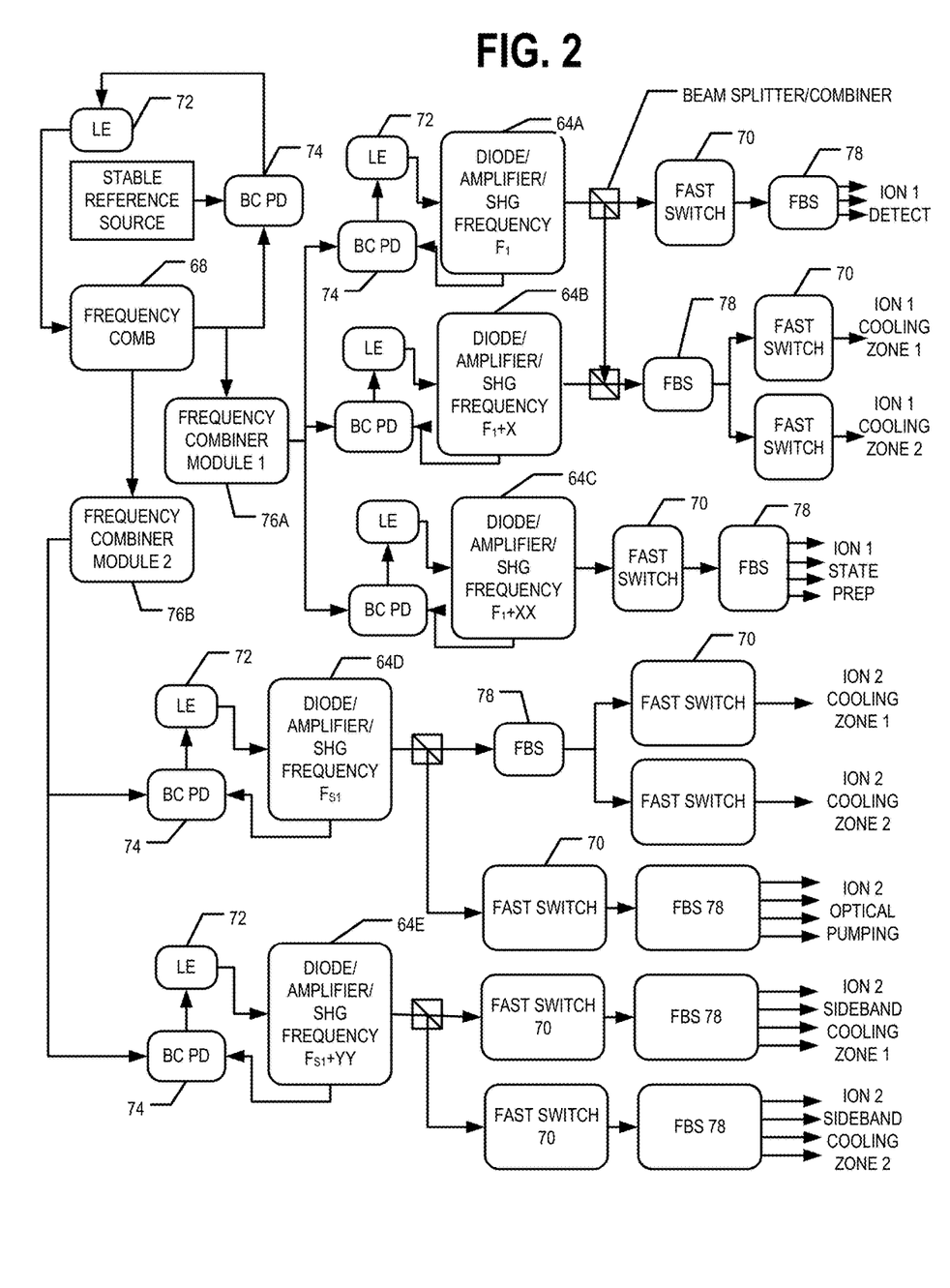
FIG. 2 provides a block diagram of an example of a portion of a quantum computer showing the locking of five lasers to a frequency comb and thereby eliminating two beamlines for two ions (a qubit ion and a corresponding sympathetic cooling (SC) ion), in accordance with an example embodiment.

FIG. 2 provides a block diagram of an example of a portion of a quantum computer 110 showing the locking of five lasers to a frequency comb 68 and thereby eliminating two beamlines for two ions (a qubit ion and a corresponding SC ion). Ion 1 refers to the qubit ion and Ion 2 refers to the SC ion associated with the qubit ion. The lasers 64 shown in FIG. 2 are illustrated by the "diode/amplifier/secondary harmonic generation (SHG)" boxes. Each individual laser 64 is locked to the frequency comb 68, and is then sent to the cryo and/or vacuum chamber 40 enclosing the ion trap and/or the ion trap 50 through a fast switch 70 (e.g., an on/off switch). Fiber optic cables 66 deliver light (e.g., laser beams) directly from a rack mount to the cryo and/or vacuum chamber 40 enclosing the ion trap and/or the ion trap 50, as opposed to large combinations of optics, mounts, and electro-optics on a large (e.g., 5'×10') optical table.

In FIG. 2, the frequency comb 68 is generated by a stable reference source (e.g., a laser (such as 100 Hz laser, in one example embodiment), a reference cavity, and/or the like of the frequency comb generator 62). In an example embodiment, the frequency comb 68 is generated through the use of the stable reference source along with locking electronics (LE) 72 and/or a beam combiner photodiode (BC PD) 74. A frequency combiner module 76A may be used to lock the first three lasers 64 (e.g., diode lasers, amplifiers, and/or SHGs) to the frequency comb 68. In an example embodiment, a laser 64 (e.g., diode laser, amplifier, and/or SHG) may be locked to the frequency comb 68 via the frequency combiner module 76 via LE 72, a BC PD 74, and/or the like. Each of the first three lasers 64A-C may be coupled to a slightly different frequency of the frequency comb 68. For example, each of the first three lasers 64A-C may be coupled to different frequency lines of the frequency comb 68. For example, a first laser 64A may be coupled to a first frequency $F_1$ (e.g., possibly having a first offset from a reference frequency $F_R$), a second laser 64B may be coupled to a second frequency $F_2$ that is offset from the first frequency $F_1$ and/or from the reference frequency $F_R$ by a second offset X, and a third laser 64C may be coupled to a third frequency $F_3$ that is offset from the first frequency $F_1$ and/or from the reference frequency $F_R$ by a third offset XX. For example, FIG. 2 shows a second laser 64B coupled to a frequency line of the frequency comb 68 having a frequency of $F_1+X$ and a third laser 64C at a frequency $F_1+XX$. The laser beam emitted by the first laser 64A may be split by a beam splitter with a first portion being provided to a fast switch 70 which controls the flow of the first portion of the beam to a fiber bench splitter (FBS) 78. The output of the FBS 78 may be provided to the cryo and/or vacuum chamber 40 enclosing the ion trap and/or the ion trap 50 to detect (e.g., a location and/or state) of a qubit ion. The laser beam emitted by the second laser 64B may be combined (e.g., via a beam combiner) with a second portion of the beam emitted by the first laser 64A (that was split off by the beam splitter) and provided to a FBS 78 that provides multiple beams to multiple fast switches 70. The output thereof may be used to cool the qubit ion in various zones of the ion trap 50 (e.g., zone 1, zone 2, etc.). The laser beam emitted by the third laser 64C may be used to prepare the qubit ion in a desired state by passing the laser beam emitted by the third laser 64C to a fast switch 70 which controls the providing of the beam to a FBS 78.

A second frequency combiner module 76B may lock two or more additional lasers 64D, 64E to the frequency comb 68. In various embodiments, the two or more additional lasers 64D, 64E may be used for cooling the SC ion. In an example embodiment, a laser 64 (e.g., diode laser, amplifier, and/or SHG) may be locked to the frequency comb 68 via the second frequency combiner module 76B via LE 72, a BC PD 74, and/or the like. The fourth laser 64D may be locked to the frequency comb 68 at a first SC frequency $F_{S1}$ and the fifth laser 64E may be locked to the frequency comb 68 at a second SC frequency $F_{S2}$. The first and second SC frequencies are offset from one another by an SC offset YY that is small compared to the first and second frequencies (e.g., at least an order of magnitude less than the first or second frequency). For example, FIG. 2 illustrates the fourth laser 64D at a first SC frequency $F_{S1}$ and the fifth laser 64E at a second SC frequency $F_{S1}+YY$. The laser beam emitted by the fourth laser 64D is split by a beam splitter with a first portion being provided to a FBS 78 and then to a fast switch 70, or a plurality of fast switches 70, for provision to the cryo and/or vacuum chamber 40 enclosing the ion trap and/or the ion trap 50 such that the output may be used for cooling the SC ion in various zones (e.g., zone 1, zone 2, etc.). A second portion of the laser beam emitted by the fourth laser 64D is provided to a fast switch 70 and then to a FBS 78 for provision to the cryo and/or vacuum chamber 40 enclosing the ion trap and/or the ion trap 50 such that the output may then be used for optical pumping of the SC ion. The laser beam emitted by the fifth laser 64E is split by a beam splitter with each portion of the beam being provided to a fast switch 70 and then a FBS 78 for provision to the cryo and/or vacuum chamber 40 enclosing the ion trap and/or the ion trap 50 such that the output may be used for sideband cooling of the SC ion in various zones (e.g., zone 1, zone 2, etc.).

Exemplary Gate Laser Pair Locking Scheme

Figure 3:
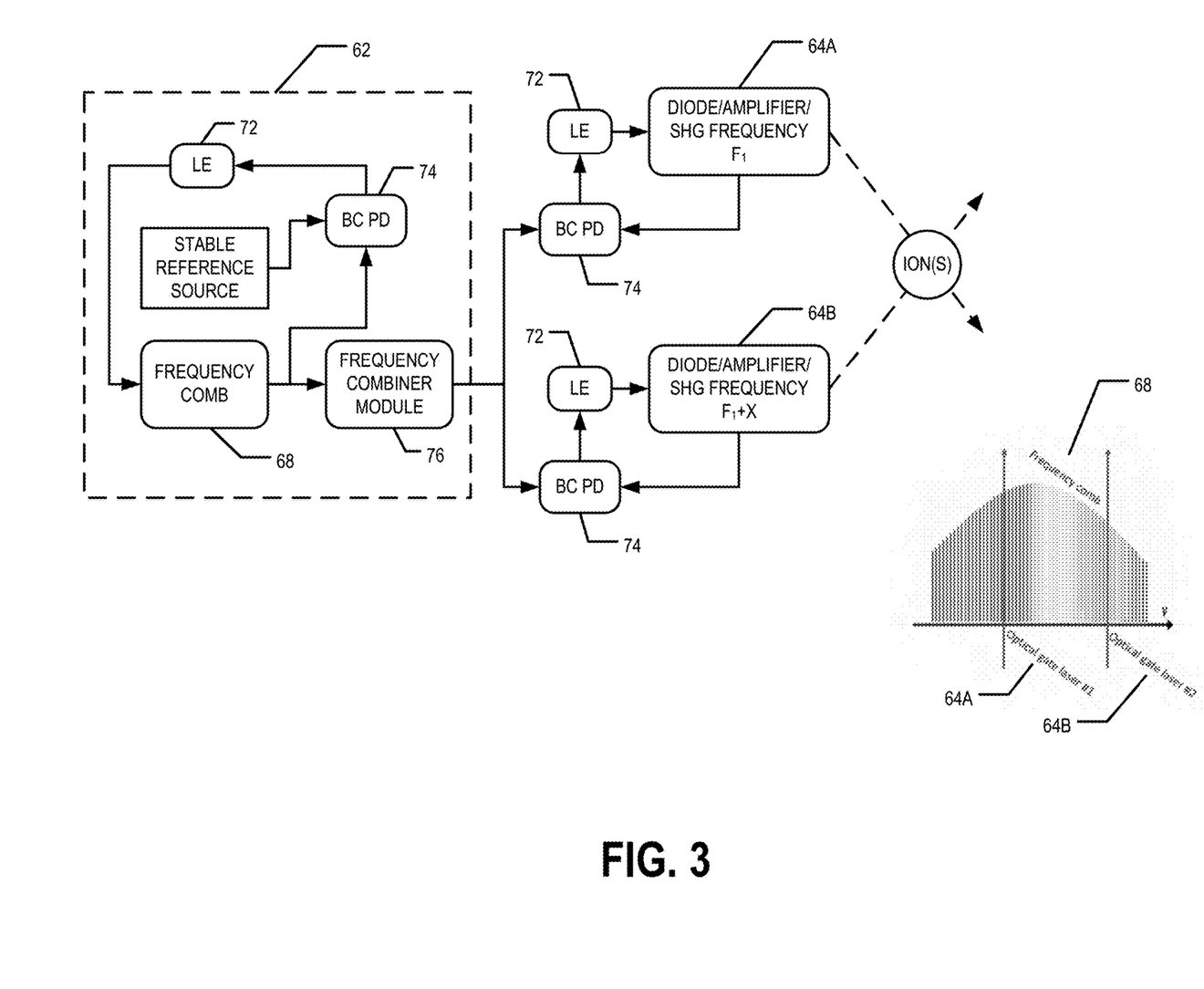
FIG. 3 provides a block diagram illustrating an example technique for locking two lasers (e.g., a pair of optical gate lasers) to a frequency comb, in accordance with an example embodiment.

FIG. 3 provides a block diagram illustrating an example technique for locking two lasers (e.g., a pair of optical gate lasers) to a frequency comb, in accordance with an example embodiment as well as a frequency plot demonstrating the lasers being locked to the frequency comb. The illustrated locking scheme includes locking two diode lasers to an optical frequency comb to narrow the line width of the diode lasers and set the frequency spacing between the two lasers. The illustrated locking scheme also obtains low phase noise between the two lasers.

For example, the frequency comb generator 62 may comprise a laser and/or other stable reference source (e.g., a reference cavity), BC PD 74, LE 72, and, optionally, a frequency conversion module. The frequency comb 68 is generated by the stable reference source along with the locking electronics (LE) 72 and/or beam combiner photodiode (BC PD) 74. A frequency combiner module 76 may be used to lock each of the pair of optical lasers to a corresponding "tooth" or line of the frequency comb 68. In an example embodiment, a laser 64 may be locked to the frequency comb 68 via the frequency combiner module 76 via LE 72, a BC PD 74, and/or the like. The frequency plot provided by FIG. 3 demonstrates the frequency comb 68 having intensity values for discrete frequency values on the x-axis. This same frequency plot also illustrates the two lasers (e.g., optical gate lasers) 64 A,B each locked to an individual optical frequency corresponding to a "tooth" or line of the frequency comb 68.

As shown in the block diagram of FIG. 3, the first laser 64A may be coupled to a first frequency $F_1$ having a first offset from a reference frequency $F_R$ and/or a resonant transition frequency of a particular transition of the qubit ion. In an example embodiment, the first offset is approximately 0 GHz. The second laser 64B may be coupled to a second frequency $F_2$ that is offset from the first frequency $F_1$, the reference frequency $F_R$, and/or the resonant transition frequency of a particular transition of the qubit ion by a second offset. The second offset is small compared to the first and second frequencies $F_1$, $F_2$ (e.g., at least an order of magnitude less than the first or second frequency). For example, FIG. 3 illustrates the second laser 64B being coupled to a second frequency $F_1+X$, with X being the second offset.

The laser beam emitted by the first laser 64A may be, optionally, conditioned and then provided to the cryo and/or vacuum chamber 40 enclosing the ion trap and/or the ion trap 50 such that the beam impinges on a particular qubit ion. The laser beam emitted by the second laser 64B may be, optionally, conditioned and then provided to the cryo and/or vacuum chamber 40 enclosing the ion trap and/or the ion trap 50 such that the beam also impinges on the particular qubit ion. In various embodiments, the (possibly conditioned) beams emitted by the first and second lasers 64A, 64B may be provided to the cryo and/or vacuum chamber 40 enclosing the ion trap and/or the ion trap 50 via fiber optic cables 66A, 66B.

Another Exemplary Gate Laser Pair Locking Scheme

Figure 4:
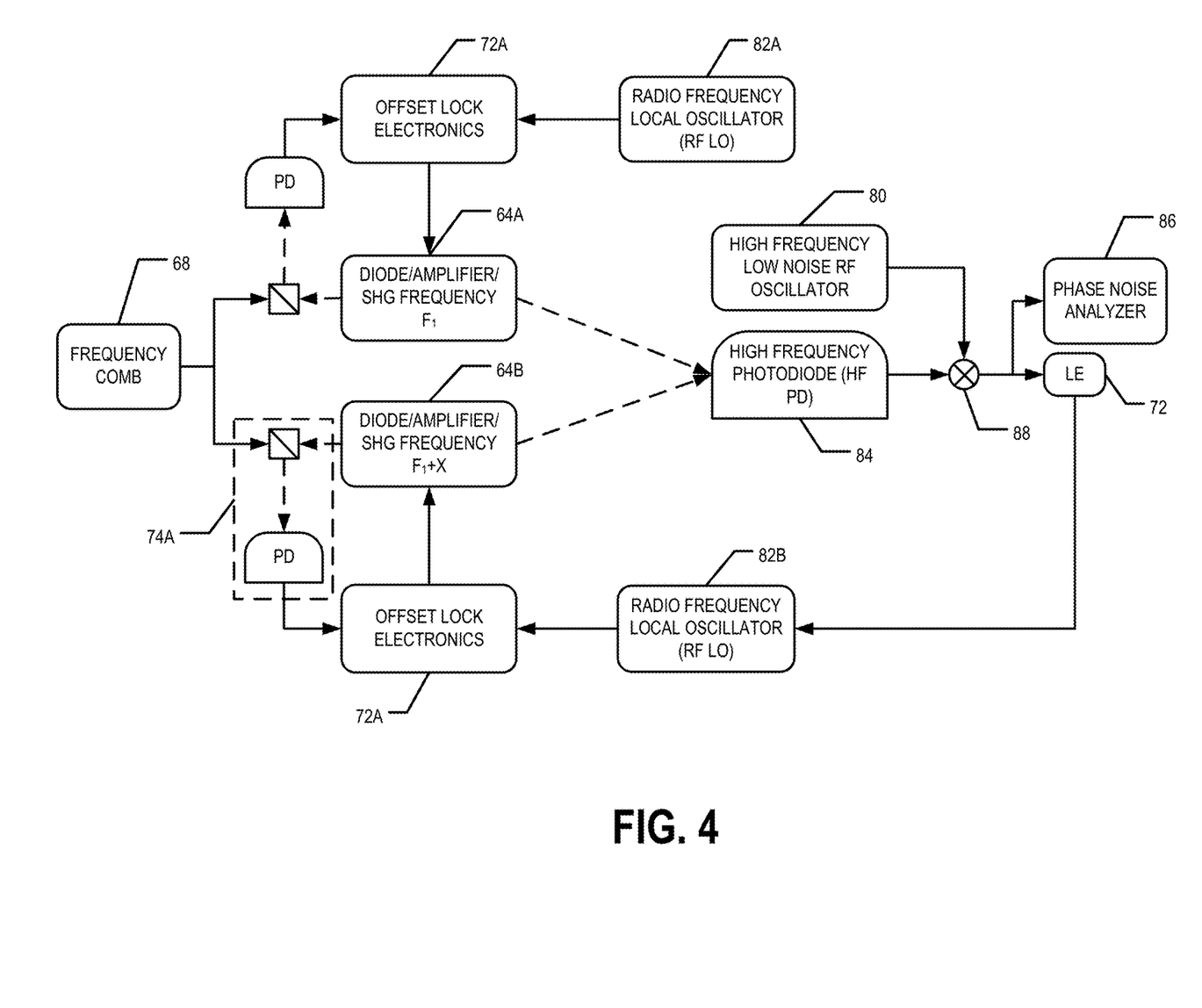
FIG. 4 provides a block diagram illustrating another example technique for locking two lasers (e.g., a pair of optical gate lasers) to a frequency comb, in accordance with an example embodiment.

FIG. 4 provides a block diagram illustrating another example technique for locking two lasers (e.g., a pair of optical gate lasers) to a frequency comb, in accordance with an example embodiment. The illustrated locking scheme allows the frequency comb 68 to narrow the linewidth of the first and second lasers 64A, 64B in addition to setting the frequency separation between the first and second lasers to a set value (e.g., frequency offset). For example, the frequency offset between the frequency of beams emitted by the first and second laser may be controlled by and/or coupled to the high frequency RF oscillator 80, which can be referenced to an absolute frequency signal. The example technique shown in FIG. 4 is configured to address any drift (e.g., long term drift) exhibited by the frequency comb. For example, the first and second lasers 64A, 64B are independently locked to the frequency comb 68 at the first and second frequencies, respectively. The first and second frequencies are offset by the second offset. For example, FIG. 4 illustrates the first laser 64A being locked to a first frequency $F_1$, and the second laser 64B being locked to a second frequency $F_1+X$, with X being the second offset. In an example embodiment, the locking of the first and second lasers 64A, 64B to the frequency comb 68 acts to narrow the line width and reduce frequency noise of the laser beams emitted by the first and second lasers 64A, 64B. In an example embodiment, a first radio frequency (RF) local oscillator (LO) 82A may be coupled to the first laser 64A via first offset lock electronics 72A, which may be, be similar to, and/or comprise locking electronics 72. In example embodiments, the first RF LO 82A may provide an oscillated signal and/or oscillate a signal with frequencies in the order of 10's to 100's of MHz to the first offset lock electronics 72A, as shown in FIG. 4.

In various embodiments, a portion of the laser beam emitted by the first laser 64A may be provided (e.g., via a beam splitter) to a photodiode to provide feedback to the first offset lock electronics. Similarly, a second RF LO 82B may be coupled to the second laser 64B via second offset lock electronics 72A with a portion of the laser beam emitted by the second laser 64B being provided (e.g., via a beam splitter) to a photodiode for providing feedback to the second offset lock electronics. For example, the second RF LO 82B may provide an oscillated signal and/or oscillate a signal with frequencies in the range of 10's to 100's of MHz to the second offset lock electronics, as shown in FIG. 4. FIG. 4 further illustrates the second laser 64B providing a portion of its emitted laser beam via a beam splitter to a photodiode in block 74A. In various example embodiments, block 74A may include a beam splitter and photodiode as illustrated, which may be and/or function similarly to the BC PD 74. Similarly, the beam splitter and photodiode receiving a portion of the laser beam emitted by the first laser 64A may also be and/or function similarly to the BC PD 74. Portions of laser beams emitted by the first and second lasers 64A, 64B are provided to a high frequency PD 84, which provides a corresponding signal to a mixer 88. The mixer 88 also receives a signal from a high frequency (e.g., GHz range) low noise RF oscillator 80. The output of the mixer 88 may be provided to a phase noise analyzer 86 for analyzing the phase noise between the first and second lasers 64A, 64B, in an example embodiment.

In various embodiments, the output of the mixer 88 may be provided to locking electronics 72 in communication with the second RF LO 82B, for example, via a modulation input port of the second RF LO 82B. In an example embodiment, providing the output of the mixer 88 (e.g., the signal from the high frequency low noise RF oscillator 80 and/or a modification thereof) to the second RF LO 82B enables the RF LO 82B to be precisely locked for low noise and to have a narrow line width. In an example embodiment, the first RF LO 82A may additionally and/or alternatively be coupled to the output of the mixer 88 and/or the high frequency low noise RF oscillator 80. Thus, the first and second lasers 64A, 64B may be locked to different frequencies (e.g., different frequency lines) of the frequency comb 68 (e.g., separated by the second offset) in a manner that compensates for any drift in the frequency comb 68. For example, the second separation may be compared to the output of the high frequency low noise oscillator 80 to reduce any drift in the second offset.

Technical Advantages

Various embodiments provide technical solutions to the technical problem of precisely and accurately, in terms of frequency, frequency offset, and/or phase, delivering one or more laser beams to an ion trap (e.g., enclosed within a cryo and/or vacuum chamber, in an example embodiment) of a trapped ion quantum computer. In particular, various embodiments provide an improvement over traditional means of providing laser beams ion trap (e.g., enclosed within a cryo and/or vacuum chamber, in an example embodiment) of a trapped ion quantum computer (e.g., using beamlines) by reducing the complexity and physical space required for the electrical, optical, and electro-optical components required for providing the laser beams to the ion trap. For example, instead of the use of beamlines generally requires the use of a 5' by 10' or 5' by 20' optical table for housing the electrical, optical, and electro-optical components, various embodiments provide for a rack mounted system (e.g., a 74" and/or 42 U rack). Moreover, the complexity of the system is reduced with respect to beamlines by permitting the use of multiple lasers that are frequency and/or phase locked against a common reference (e.g., the frequency comb) rather than using optical components to modify the frequency of portions of a beam emitted by a single laser. Moreover, with respect to single, pairs, and/or groups of gate lasers, locking the gate lasers to a frequency comb enables for a stable separation in frequency between pairs and/or groups of gate lasers without introducing a large source of phase noise. The phase noise (slip of the phase of an electromagnetic wave) on the optical gate lasers is an extremely important metric when determining the error in a qubit operation. Thus, various embodiments provide for high gate fidelity for performing operations on qubits in the trapped ion quantum computer by helping to maintain low phase noise between pairs and/or groups of gate lasers.

Exemplary Controller

In various embodiments, the controller 30 may comprise various controller elements including processing elements, memory, driver controller elements, analog-digital converter elements, and/or the like. For example, the processing elements may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. For example, the memory may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the driver controller elements may include one or more drivers and/or controller elements each configured to control one or more drivers.

In various embodiments the drivers may be laser drivers; vacuum component drivers; drivers for controlling the flow of current and/or voltage applied to DC, RD, and/or other electrodes used for maintaining and/or controlling the ion trapping potential of the ion trap 50; cryo system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements configured to receive signals from one or more optical receiver components. In various embodiments, the controller 30 may comprise means for receiving executable instructions, command sets, and/or the like from the system computing entity 20 and providing output received from the quantum computer 110 (e.g., from an optical collection system) and/or the result of a processing the output to the system computing entity 20. In various embodiments, the system computing entity 20 and the controller 30 may communicate via a direct wired and/or wireless connection and/or one or more wired and/or wireless networks.

Exemplary System Computing Entity

Figure 5:
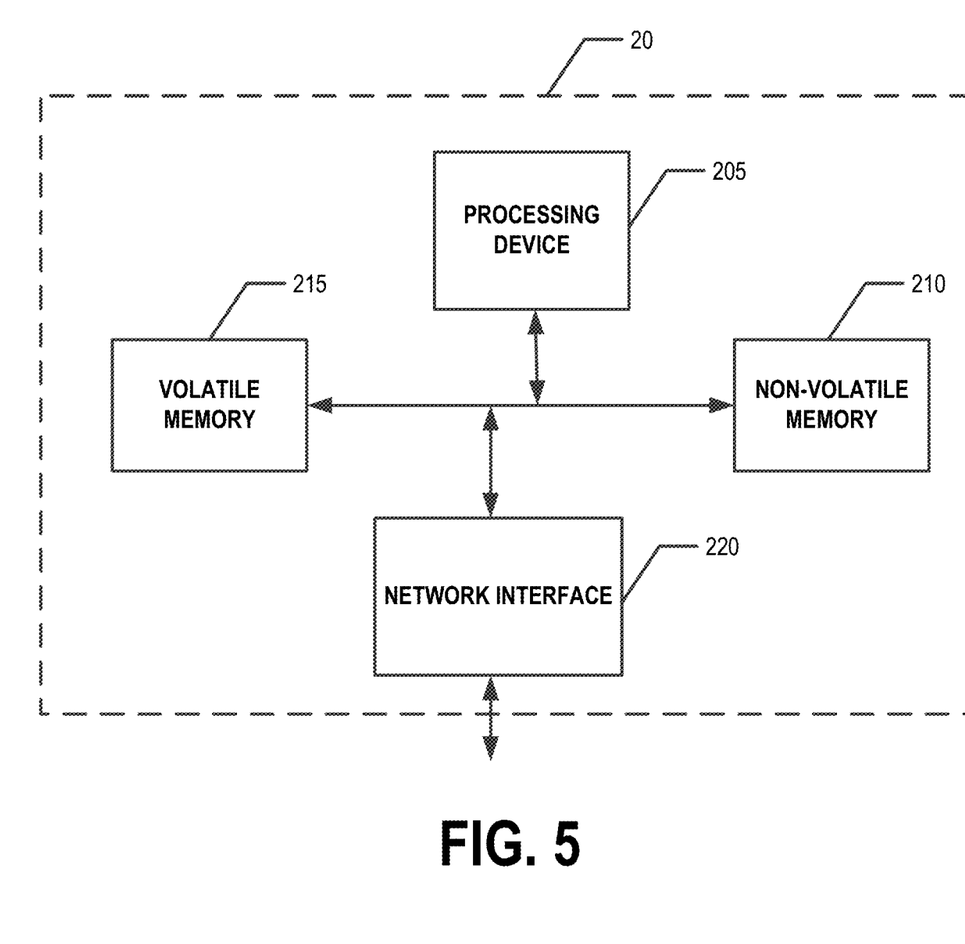
FIG. 5 provides a schematic diagram of an example system computing entity that may be used in accordance with an example embodiment.

FIG. 5 provides a schematic of a system computing entity 20 according to one embodiment of the present invention. As noted above, the system computing entity 20 may be configured to act as an intermediary between the controller 30 of the quantum computer 110 and one or more user computing entities 10. In general, the terms system computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for instance, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 5, in one embodiment, the system computing entity 20 may include or be in communication with one or more processing elements 205 (also referred to as processors, processing circuitry, and/or similar terms used herein interchangeably) that communicate with other elements within the system computing entity 20 via a bus, for instance. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the system computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the system computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for instance, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the system computing entity 20 with the assistance of the processing element 205 and operating system.

As indicated, in one embodiment, the system computing entity 20 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the system computing entity 20 may communicate with computing entities or communication interfaces of one or more user computing entities 10, controller 30, and/or the like.

As indicated, in one embodiment, the system computing entity 20 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 20 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The system computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the system computing entity's 20 components may be located remotely from other system computing entity 20 components, such as in a distributed system. Furthermore, one or more of the components may be combined and additional components performing functions described herein may be included in the system computing entity 20. Thus, the system computing entity 20 can be adapted to accommodate a variety of needs and circumstances.

Exemplary User Computing Entity

Figure 6:
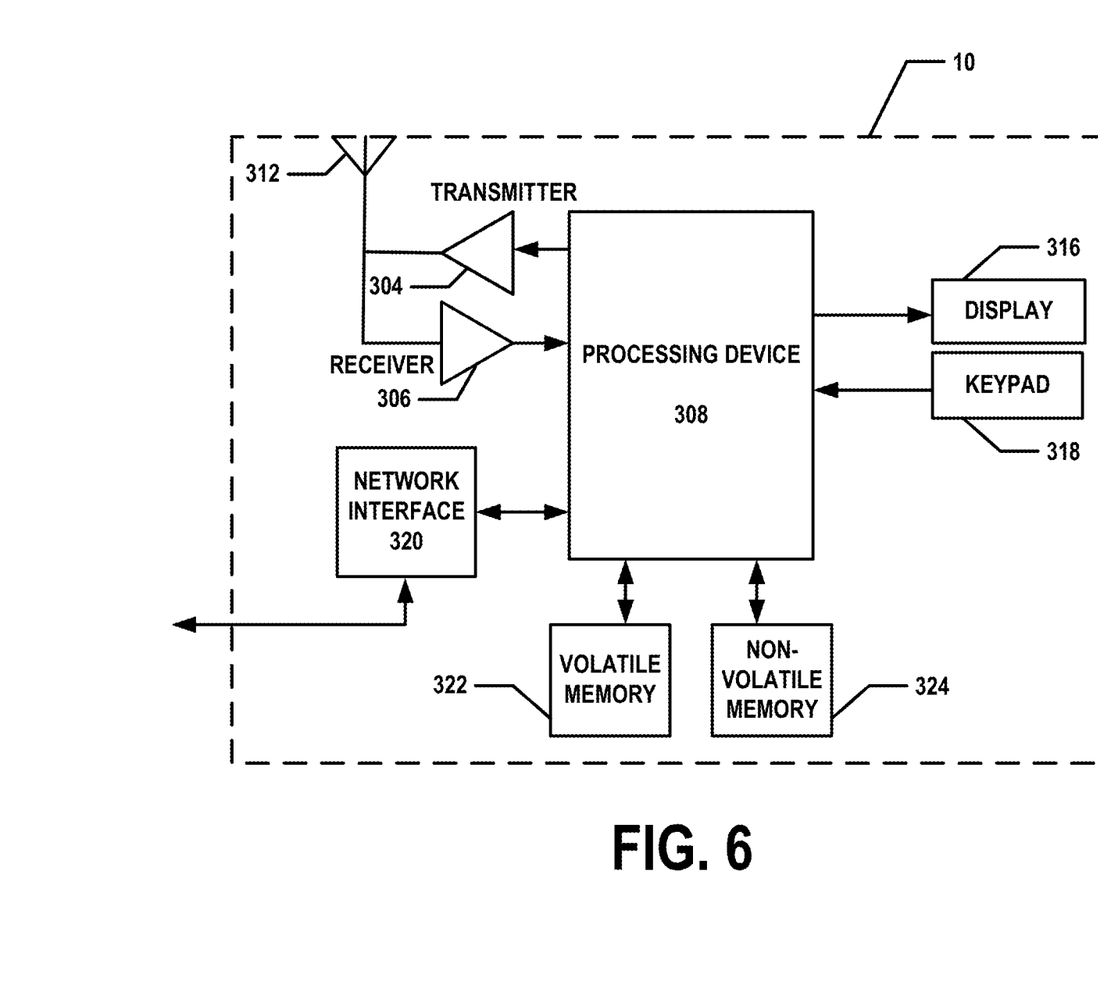
FIG. 6 provides a schematic diagram of an example user computing entity that may be used in accordance with an example embodiment.

FIG. 6 provides an illustrative schematic representative of an example user computing entity 10 that can be used in conjunction with embodiments of the present invention. In various embodiments, a user computing entity 10 is configured to allow a user to provide input to the quantum computer system 100 (e.g., via a user interface of the user computing entity 10) and receive, view, and/or the like output from the quantum computer system 100.

As shown in FIG. 6, a user computing entity 10 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a system computing entity 20, and/or the like. In this regard, the user computing entity 10 may be capable of operating with one or more air interface standards, communication protocols, modulation types, and access types. More particularly, the user computing entity 10 may operate in accordance with any of a number of wireless communication standards and protocols. In a particular embodiment, the user computing device 10 may operate in accordance with multiple wireless communication standards and protocols, such as GPRS, UMTS, CDMA2000, 1×RTT, WCDMA, TD-SCDMA, LTE, E-Utran, EVDO, HSPA, HSDPA, Wi-Fi, WiMAX, UWB, IR protocols, Bluetooth protocols, USB protocols, and/or any other wireless protocol.

Via these communication standards and protocols, the user computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 10 can also download changes, add-ons, and updates, for instance, to its firmware, software (e.g., including executable instructions, applications, program modules), and operating system.

According to one embodiment, the user computing entity 10 may include location determining aspects, devices, modules, functionalities, and/or similar words used herein interchangeably. For example, the user computing entity 10 may include outdoor positioning aspects, such as a location module adapted to acquire, for instance, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the user computing entity's 10 position in connection with a variety of other systems, including cellular towers, Wi-Fi access points, and/or the like. Similarly, the user computing entity 10 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 10 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For instance, the user output interface may be configured to provide an application, browser, user interface, interface, dashboard, screen, webpage, page, and/or similar words used herein interchangeably executing on and/or accessible via the user computing entity 10 to cause display or audible presentation of information/data and for user interaction therewith via one or more user input interfaces. The user input interface can comprise any of a number of devices allowing the user computing entity 10 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 10 can collect information/data, user interaction/input, and/or the like.

The user computing entity 10 can also include volatile storage or memory 322 and/or non-volatile storage or memory 324, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 10.

In example embodiments, the user computing entity 10 may be in communication with other user computing entities 10 and/or a system computing entity 20.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A laser system for a trapped ion quantum computer, the laser system comprising:
    a first laser being frequency locked and phase locked to a first frequency line of a frequency comb; and
    a second laser being frequency locked and phase locked to a second frequency line of the frequency comb, wherein:
        the first laser is configured to provide a first laser beam and the second laser is configured to provide a second laser beam, there is a stable frequency separation between the first laser beam and the second laser beam, there is a stable phase relationship between the first laser beam and the second laser beam, and the first laser beam and the second laser beam are configured to be provided to a qubit ion within an ion trap of the trapped ion quantum computer to enact a controlled evolution of a quantum state of the qubit ion; and
    a sympathetic cooling (SC) laser being frequency locked to a first SC frequency line of the frequency comb, wherein the ion trap of the trapped ion quantum computer contains at least the qubit ion and a sympathetic cooling ion and at least a portion of a SC laser beam generated by the SC laser is used for qubit ion cooling using the SC ion.

2. The laser system of claim 1, further comprising:
    a first radio frequency local oscillator (RF LO) coupled to the first laser; and
    a second RF LO coupled to the second laser.

3. The laser system of claim 2, further comprising:
    first offset lock electronics, wherein the first RF LO is coupled to the first laser via the first offset lock electronics; and
    second offset lock electronics, wherein the second RF LO is coupled to the second laser via the second offset lock electronics.

4. The laser system of claim 3, further comprising:
    a first photodiode configured to receive a portion of the first laser beam emitted by the first laser and provide feedback to the first offset lock electronics; and
    a second photodiode configured to receive a portion of the second laser beam emitted by the second laser and provide feedback to the second offset lock electronics.

5. The laser system of claim 4, further comprising:
    a third photodiode configured to receive another portion of the first laser beam and another portion of the second laser beam and provide a laser offset signal to a mixer, wherein the third photodiode is a high frequency photodiode;
    a high frequency oscillator configured to provide an oscillator signal to the mixer;
    the mixer configured to compare the laser offset signal and the oscillator signal and provide a comparison signal to locking electronics; and
    the locking electronics, wherein the locking electronics are coupled to the second RF LO via a modulation input port of the second RF LO.

6. The laser system of claim 5, wherein the locking electronics are coupled to the first RF LO via a modulation input port of the first RF LO.

7. The laser system of claim 5, wherein the high frequency oscillator is a high frequency low noise radio frequency oscillator.

8. The laser system of claim 1, further comprising a frequency comb generator configured to generate the frequency comb.

9. The laser system of claim 1, wherein the first frequency line and second frequency line are offset from one another by a second offset, the second offset being non-zero.

10. The laser system of claim 9, further comprising:
    a third laser locked to a third frequency line of the frequency comb, the third frequency line is offset from the first frequency line by a third offset, the third offset being non-zero, and
    wherein the third laser is configured to provide one or more laser beams to the ion trap of the trapped ion quantum computer.

11. The laser system of claim 10, wherein the third frequency line is resonant with a transition frequency of a particular quantum transition of the qubit ion.

12. The laser system of claim 11, wherein at least a portion of a third laser beam generated by the third laser is used for determining the quantum state of the qubit ion.

13. The laser system of claim 1, wherein the first frequency line is offset from a resonant frequency of a particular quantum transition of the qubit ion by a first offset.

14. The laser system of claim 10, wherein at least a portion of a third laser beam generated by the third laser is used for qubit ion state preparation.

15. The laser system of claim 10, wherein one or more of a first frequency characterizing the first frequency line, a second frequency characterizing the second frequency line, a third frequency characterizing the third frequency line, the second offset, or the third offset are determined based at least in part on a resonant frequency of a particular quantum transition of the qubit ion.

16. The laser system of claim 10, further comprising:
    a fifth laser locked to a second SC frequency line of the frequency comb, wherein the SC laser is a fourth laser and the first and second SC frequency lines being offset from one another by a SC offset;

wherein the fourth laser and the fifth laser are each configured to provide one or more laser beams to the ion trap of the trapped ion quantum computer.

17. The laser system of claim 16, wherein at least a portion of a fourth laser beam generated by the fourth laser is used for SC ion cooling.

18. The laser system of claim 16, wherein at least a portion of a fourth laser beam generated by the fourth laser is used for SC ion optical pumping.

19. The laser system of claim 16, wherein at least a portion of a fifth laser beam generated by the fifth laser is used for SC ion sideband cooling.

20. The laser system of claim 16, wherein the first, second, and third lasers are each configured to provide one or more laser beams to the qubit ion and the fourth and fifth lasers are each configured to provide one or more laser beams to the SC ion confined by the ion trap.

* * * * *